United States Patent [19]
Ernst

[11] 3,869,401
[45] Mar. 4, 1975

[54] STABILIZED ACIDIC HYDROGEN PEROXIDE SOLUTIONS

[75] Inventor: Richard Edward Ernst, Memphis, Tenn.

[73] Assignee: E. I. du Pont de Nemours and Company, Wilmington, Del.

[22] Filed: Dec. 4, 1972

[21] Appl. No.: 311,975

[52] U.S. Cl............... 252/186, 8/111, 55/244, 252/100, 252/102, 252/544, 423/272, 423/273
[51] Int. Cl............... C01b 15/02, B01d 53/00
[58] Field of Search....... 252/186, 95, 98, 100, 102, 252/544; 8/111; 423/272, 273, 584; 55/244

[56] References Cited
UNITED STATES PATENTS

| | | | |
|---|---|---|---|
| 3,373,113 | 3/1968 | Achenbach | 252/100 |
| 3,388,069 | 6/1968 | Lindner | 252/186 |
| 3,649,194 | 3/1972 | Glanville | 252/186 |

OTHER PUBLICATIONS

Condensed Chemical Dictionary, Sixth Edition, Reinhold, 1961; pp. 10, 42, 43, 180, 190, 590, 696, 806.

Lange's Handbook of Chemistry, Eighth Edition, Handbook Publishers, 1952; p. 76.

*Primary Examiner*—Benjamin R. Padgett
*Assistant Examiner*—Irwin Gluck

[57] ABSTRACT

Stabilizers are provided which control chloride ion-catalyzed degradation of hydrogen peroxide, at concentrations of up to about 5 percent $H_2O_2$ by weight, in solutions of certain strong acids at up to about 85 percent by weight concentration, and at temperatures up to about 90° C. Such stabilizers are included in concentrations up to about 5 percent by weight. The stabilizers include phenol and dihydroxybenzenes and their lower alkyl derivatives, and mononitrophenols; certain unsaturated aliphatic alcohols and amines; compounds containing a dicarbonyl methylene group capable of enolization in acid media; sodium styrene sulfonate; allyl acetate; and mixtures thereof.

9 Claims, No Drawings

STABILIZED ACIDIC HYDROGEN PEROXIDE SOLUTIONS

BACKGROUND OF THE INVENTION

This invention relates to stabilizers for $H_2O_2$ against degradation induced by chloride ions in acidic aqueous solution.

$H_2O_2$ in acid solution is well known in the dissolution of metals in etching applications. In the presence of metal ions, however, $H_2O_2$ tends to decompose rapidly. It is also known that pH effects induce the degradation of $H_2O_2$. Stabilization of $H_2O_2$ against these causes of degradation has been the goal of much research effort. While it has also long been known that chloride ion in relatively dilute (i.e., less than 30 percent by weight) acidic medium catalyses the slow decomposition of $H_2O_2$, it has now been found that in acid (e.g., sulfuric) of 30 percent concentration or more, small amounts of chloride ion can catalyze the peroxide decomposition at rates high enough to cause severe economic losses due to loss of $H_2O_2$.

SUMMARY OF THE INVENTION

According to the present invention, there are provided stabilizers selected from the group consisting of:
a. phenol, dihydroxybenzenes, and their alkyl derivatives containing one or two lower alkyl substituents, and mononitrophenols;
b. unsaturated aliphatic alcohols and amines having a chain length of three to five carbon atoms but excluding unsubstituted alkynyl alcohols;
c. compounds containing a dicarbonyl methylene group

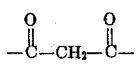

and capable of enolization in acid media;
d. sodium styrene sulfonate; allyl acetate; and mixtures of the foregoing,
which stabilize against degradation of $H_2O_2$ in concentrated acid medium in the presence of chloride ions at concentrations of as much as 5,000 ppm, by weight, or more, and at temperatures of up to about 90° C. The acid may be sulfuric, acetic, or mixtures of these, at concentrations of about 30 to 85 percent by weight. These stabilizers may be formulated with $H_2O_2$ and acid to form an aqueous, acidic oxidizing solution, or may preferably be included in the concentrated aqueous $H_2O_2$ solution, as commercially prepared and sold, prior to adding the $H_2O_2$ to the acid stream.

DETAILED DESCRIPTION OF THE INVENTION

It has been found that the presence of chloride ions at concentrations of about 50 ppm by weight, or more, in concentrated acid streams containing $H_2O_2$, particularly when such streams are at elevated temperatures, leads to severe decomposition of the $H_2O_2$. While the acid involved may be acetic, the problem is particularly significant when the acid is sulfuric or a mixture of Caro's acid and sulfuric acid. These latter two acids are present in process streams in sulfuric acid manufacture wherein sulfur dioxide is being abated by treatment with a sulfuric acid stream containing $H_2O_2$. Hydrogen peroxide decomposition rate is quite sensitive to the acid concentration. Table I is illustrative.

TABLE I

Decomposition Rate of $H_2O_2$ vs. $H_2SO_4$ Concentration at 200 ppm Cl⁻ and 55°C.

| $H_2SO_4$ Concentration, % | Decomposition Rate, %/hr. |
|---|---|
| 30 | about 0 |
| 47 | 11 |
| 50 | 18 |
| 52.5 | 26 |
| 58 | 70 |
| 61 | 70 |
| 76 | 17 |
| 90 | about 0 |

From Table I it is seen that $H_2O_2$ decomposition is significant in the $H_2SO_4$ range of 30 to 90 percent and peaks at about 60 percent.

The instant invention provides for the inclusion of certain stabilizing reagents in hydrogen peroxidecontaining concentrated acid streams, which reagents prevent or minimize chloride-catalyzed degradation of the $H_2O_2$. The reagents are also effective in preventing bromide-catalyzed decomposition of $H_2O_2$. It is believed that the stabilizers of the instant invention function by, in effect, removing chloride or bromide ion from the acid.

The presumed mechanism by which the organic compounds of this invention remove chloride ion from acids is as follows. In the first step, the hydrogen peroxide oxidizes chloride to chlorine.

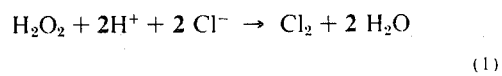

(1)

The chlorine thus generated then reacts with the organic stabilizer, X, to give the corresponding chlorinated organic.

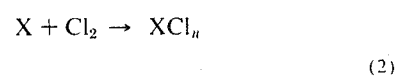

(2)

It is also possible for the generated chlorine to undergo another reaction, that with hydrogen peroxide, to give chloride.

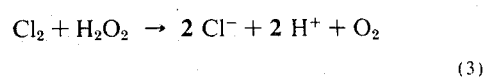

(3)

It is thus a necessary requirement of the stabilizer X that it be sufficiently reactive toward chlorination that it can successfully compete with $H_2O_2$ for the generated chlorine.

In the absence of compound X, the two reactions (1) + (3) account for the decomposition of hydrogen peroxide by the following overall net reaction.

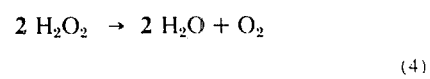

(4)

Compound X thus is believed to stabilize hydrogen peroxide under these conditions by its ability to interrupt this cyclic decomposition route by effectively removing the chlorine catalyst.

A specific example of the utility of the invention is as follows. In a chemical scrubbing system for abating or removing oxidizable noxious gases from a gas stream using a sulfuric acid/hydrogen peroxide scrubbing solution, due to evaporative losses, makeup water must be added to the scrubbing solution. Most water sources contain chloride, generally at levels from 10–200 ppm, and thus chloride will be introduced into the scrubbing solution along with this makeup water. If chloride is permitted to build up to more than 50 ppm, intolerably high hydrogen peroxide decomposition rates will readily be observed. Thus, the scrubbing process will be improved by adding a stabilizer of this invention to the scrubbing oxidizing solution. The stabilizer may be added to the acid/$H_2O_2$ scrubbing solution, to the $H_2O_2$ makeup stream, or to a concentrated acid stream before mixing with $H_2O_2$.

In practicing the instant invention, it will be found especially convenient if the stabilizer is incorporated into the concentrated aqueous $H_2O_2$ solution as available commercially. Such a solution can be readily formulated by the $H_2O_2$ manufacturer to contain at least 5 and as much as 50,000 ppm by weight of the stabilizer, or even more if desired, to provide for dilution of the $H_2O_2$ in use.

The stabilizers may be included in a solution of $H_2O_2$ in concentrated acid at levels of about 5 to 50,000 ppm by weight, or more. The preferred concentration range is about 100 to 5,000 ppm. Mixtures of the stabilizers may also be used. The stabilizers will effectively control chloride-catalyzed decomposition at temperatures from ambient to about 90° C.; however, for most processes presently envisioned, the typical temperature range would be about 35° to 70° C. The $H_2O_2$ concentration in the acid solution may range from about 0.1 to 5 percent by weight, preferably about 0.2 to 1.0 percent. if the stabilizer is formulated into concentrated aqueous $H_2O_2$, the $H_2O_2$ concentration may range from about 20 to 80 percent by weight, preferably about 30 to 70 percent.

Because of the mechanism by which the invention works, there is no theoretical limit on the amount of $Cl^-$ which may be stabilized against. As a practical matter, however, the $Cl^-$ concentration may range from a trace to over 5,000 ppm by weight, more commonly, about 50 to 1,000 ppm by weight.

The acid concentration may range form about 30 to 85 percent by weight, preferably about 40 to 70 percent by weight. The stabilizers of this invention function well in sulfuric acid, mixtures of sulfuric with Caro's acid (which typically results from equilibration of $H_2O_2$ in $H_2SO_4$), acetic acid, and mixtures of these acids. Because of the present-day emphasis on $SO_2$ abatement, sulfuric acid is the most commercially significant member of the group. Furthermore, chloride-catalyzed degradation of $H_2O_2$ is at its most severe in the hot concentrated acid streams present in $H_2SO_4$ manufacture.

A wide variety of organic compounds, each capable of undergoing reaction (2), above, may be used in the practice of this invention. Four general groups of compounds have been identified: (a) phenol, dihydroxybenzenes and lower alkyl derivatives of these (lower alkyl as used herein means one to four carbon chain length), and o-, m-, and p-mononitrophenol; (b) unsaturated aliphatic alcohols and amines having a chain length of three to five carbon atoms (but excluding unsubstituted alkynyl alchols, such as propargyl alcohol); (c) compounds containing the dicarbonyl methylene group —CO—CH₂—CO— and capable of enolization in the acidic hydrogen peroxide media disclosed herein; (d) sodium styrene sulfonate, allyl acetate; and mixtures of the preceding. As is well known, enolization refers to the migration of hydrogen to form the group

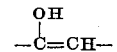

from the corresponding carbonyl.

The invention is illustrated by the following examples, wherein the percentages are by weight.

EXAMPLES 1–5

To solutions of 50% $H_2SO_4$ containing 100 ppm $Cl^-$ (added as NaCl) at 55°C. was added allyl alcohol, malonic acid, or phenol at the levels indicated in Table II. At time = 0, 70% $H_2O_2$ was added to the solutions (initial $H_2O_2$ concentration was 0.6 weight percent), and the free chloride ion concentration was measured at various intervals thereafter with a chloride ion-selective electrode. As is shown in Table II, the chloride concentrations are greatly reduced. The rate and extent of chloride removal depend on choice and concentration of the organic compound.

In control experiments (not shown) in which only hydrogen peroxide was added to the 50% $H_2SO_4$ containing 100 ppm $Cl^-$, at 55° C., the chloride concentration remained essentially unchanged over the 2-hour test period, and the hydrogen peroxide decomposed steadily at about 11 percent/hr.

In Examples 1–5, the effect of removing chloride ion on the decomposition of the hydrogen peroxide is readily evident. In Example 1, the peroxide decomposed at about 5 percent/hr., and in No. 2, at about 2 percent/hr. In Examples 3 and 5, the decomposition rate for the first 2 hours was about 1.5 percent/hr., and the solution became essentially stable for the next 3 hours. In Example 4, the decomposition rate during the first 2 hours was about 4 percent/hr., then dropped to about 0.6 percent/hr. for the next 3 hours. It is clear that removal of chloride by the stabilizer greatly reduced the extent of decomposition of the hydrogen peroxide.

TABLE II

| Example No. | Additive | ppm | $Cl^-$(ppm) Time (min.) | | | |
|---|---|---|---|---|---|---|
| | | | 0 | 25 | 40 | 120 |
| 1 | Allyl alcohol | 100 | 100 | 25 | 25 | 25 |
| 2 | Allyl alcohol | 200 | 100 | 16 | 4 | 4 |
| 3 | Allyl alcohol | 400 | 100 | 20 | 3 | <1 |
| 4 | Malonic acid | 300 | 100 | 59 | 35 | 7 |
| 5 | Phenol | 100 | 100 | 15 | 4 | 1 |

EXAMPLES 6-15

Additives other than those in Examples 1–5 were also found to be effective in stabilizing hydrogen peroxide in 50% $H_2SO_4$ containing 100 ppm $Cl^-$ at 55° C. In Table III is shown the decomposition rate of hydrogen peroxide in the presence of various additives. These rates are all markedly lower than the 11 percent/hr. found for the control (not shown).

TABLE III

| Example No. | Additive | ppm | Decomposition Rate (%/hr.) |
|---|---|---|---|
| 6 | hydroquinone | 100 | 0.2 |
| 7 | resorcinol | 100 | 2 |
| 8 | m-nitrophenol | 400 | 4 |
| 9 | allyl amine | 200 | <0.1 |
| 10 | sodium styrene sulfonate | 700 | 3.5 |
| 11 | allyl acetate | 400 | 1.2 |
| 12 | 2-butene-1,4-diol | 150 | 3.0 |
| 13 | 2-butyn-1,4-diol | 300 | 4.5 |
| 14 | acetylacetone | 400 | 2.1 |
| 15 | malonoamide | 300 | 2.3 |

I claim:

1. A concentrated, acidic, aqueous solution of hydrogen peroxide stabilized against chloride ion-induced degradation by about 5 to 50,000 ppm by weight of a stabilizer selected from the group consisting of:
   a. dihydroxybenzenes, alkyl derivatives of phenol and dihydroxybenzenes, said derivatives containing one or two lower alkyl substituents, and mononitrophenols;
   b. unsaturated aliphatic amines having a chain length of three to five carbon atoms;
   c. compounds containing a dicarbonyl methylene group

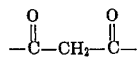

and capable of enolization in acid media;
   d. sodium styrene sulfonate; allyl acetate; and mixtures of the foregoing.

2. A solution of claim 1 wherein the hydrogen peroxide concentration is about 30 to 70 percent by weight.

3. A solution of claim 1 wherein the stabilizer concentration is about 100 to 5,000 ppm by weight.

4. An aqueous, acidic oxidizing solution stabilized against chloride ion-induced degradation at temperatures from ambient to about 90° C. containing about 0.1 to 5 percent by weight hydrogen peroxide, about 30 to 85 percent by weight of a strong acid selected from the group consisting of $H_2SO_4$, mixtures of $H_2SO_4$ and $H_2SO_5$, $CH_3COOH$, and their mixtures and about 5 to 50,000 ppm by weight of a stabilizer selected from the group consisting of:
   a. phenol, dihydroxybenzenes, and their alkyl derivatives containing one or two lower alkyl substituents, and mononitrophenols;
   b. unsaturated aliphatic alcohols and amines having a chain length of three to five carbon atoms but excluding unsubstituted alkynyl alcohols;
   c. compounds containing a dicarbonyl methylene group

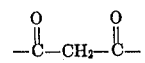

and capable of enolization in acid media;
   d. sodium styrene sulfonate; allyl acetate; and mixtures of the foregoing.

5. The solution of claim 4 wherein the hydrogen peroxide concentration is about 0.2 to 1.0 percent by weight.

6. The solution of claim 4 wherein the acid is $H_2SO_4$.

7. The solution of claim 4 wherein the acid is a mixture of $H_2SO_4$ and $H_2SO_5$.

8. The solution of claim 4 wherein the acid concentration is about 40 to 70 percent by weight.

9. The solution of claim 4 wherein the temperature is about 35° to 70° C.

* * * * *